(12) United States Patent
Webber et al.

(10) Patent No.: US 12,141,413 B2
(45) Date of Patent: Nov. 12, 2024

(54) EVALUATION OF INTERACTIONS WITH A USER INTERFACE

(71) Applicant: FullStory, Inc., Atlanta, GA (US)

(72) Inventors: Joel Grayson Webber, Marietta, GA (US); Stephanie Jill Brubaker, Marietta, GA (US); Hollis Bruce Johnson, Jr., Atlanta, GA (US); Ian Thomas Rose, Decatur, GA (US); Scott Mitchell Voigt, Atlanta, GA (US); Jaime Michael Yap, Atlanta, GA (US); Joshua Calvin Teague, Marietta, GA (US)

(73) Assignee: FullStory, Inc., Atlanta, GA (US)

( * ) Notice: Subject to any disclaimer, the term of this patent is extended or adjusted under 35 U.S.C. 154(b) by 0 days.

(21) Appl. No.: 18/317,636

(22) Filed: May 15, 2023

(65) Prior Publication Data
US 2023/0400954 A1  Dec. 14, 2023

Related U.S. Application Data

(63) Continuation of application No. 17/548,856, filed on Dec. 13, 2021, now Pat. No. 11,687,208, which is a (Continued)

(51) Int. Cl.
G06F 3/0481 (2022.01)
G06F 9/451 (2018.01)
(Continued)

(52) U.S. Cl.
CPC ............ *G06F 3/0481* (2013.01); *G06F 9/451* (2018.02); *G06F 11/302* (2013.01);
(Continued)

(58) Field of Classification Search
CPC ..... G06F 3/0481; G06F 11/3438; G06F 9/451
See application file for complete search history.

(56) References Cited

U.S. PATENT DOCUMENTS 6,226,785 B1  5/2001  Peterson et al.
8,065,410 B1  11/2011  Breen et al.
(Continued)

FOREIGN PATENT DOCUMENTS

CA    2508196       12/2005
WO    WO 2002/017165  2/2002

*Primary Examiner* — Asher D Kells
(74) *Attorney, Agent, or Firm* — Fish & Richardson P.C.

(57) ABSTRACT

Methods, systems, and apparatus, including computer programs encoded on a computer storage medium, for evaluating interactions with a user interface are disclosed. In one aspect, a method includes identifying a set of mutation events specifying changes to the structure of a user interface that occurred during the user session, and generating user interface states specifying different structures of the user interface throughout the given user session. Based at least in part on the user interface states, playback data that present visual changes of the user interface corresponding to the set of mutation events that occurred during the user session are generated. Session activity data describing user interactions that occurred during the user session are also generated. At least a portion of the playback data and the session activity data are output to a requesting device.

14 Claims, 5 Drawing Sheets

Related U.S. Application Data continuation of application No. 17/094,390, filed on Nov. 10, 2020, now Pat. No. 11,199,939, which is a continuation of application No. 16/535,799, filed on Aug. 8, 2019, now Pat. No. 10,838,571, which is a continuation of application No. 15/896,887, filed on Feb. 14, 2018, now Pat. No. 10,402,041, which is a continuation of application No. 15/695,951, filed on Sep. 5, 2017, now Pat. No. 9,927,947, which is a continuation of application No. 14/587,481, filed on Dec. 31, 2014, now Pat. No. 9,766,769.

(51) Int. Cl.
*G06F 11/30* (2006.01)
*G06F 11/34* (2006.01)
*G06F 11/36* (2006.01)
*G06F 40/14* (2020.01)

(52) U.S. Cl.
CPC ...... *G06F 11/3438* (2013.01); *G06F 11/3668* (2013.01); *G06F 40/14* (2020.01)

(56) References Cited

U.S. PATENT DOCUMENTS

| | | | |
|---|---|---|---|
| 8,839,116 B2 | 9/2014 | Schmidt et al. | |
| 8,914,496 B1 | 12/2014 | Richardson et al. | |
| 9,063,803 B1 | 6/2015 | Lewkovitz | |
| 9,305,268 B2 | 4/2016 | Wu et al. | |
| 9,766,769 B1 | 9/2017 | Webber et al. | |
| 9,927,947 B1 | 3/2018 | Webber et al. | |
| 10,402,041 B2 | 9/2019 | Webber et al. | |
| 10,838,571 B2 | 11/2020 | Webber et al. | |
| 11,036,524 B1 | 6/2021 | Mastracci et al. | |
| 11,199,939 B2 | 12/2021 | Webber et al. | |
| 11,687,208 B2 | 6/2023 | Webber et al. | |
| 2003/0142122 A1* | 7/2003 | Straut | G06F 11/3476 714/E11.193 |
| 2004/0100507 A1 | 5/2004 | Hayner et al. | |
| 2004/0111727 A1 | 6/2004 | Schwarzbauer et al. | |
| 2004/0261026 A1 | 12/2004 | Corson | |
| 2005/0144595 A1 | 6/2005 | McLean | |
| 2005/0254775 A1 | 11/2005 | Hamilton et al. | |
| 2005/0278728 A1 | 12/2005 | Klementiev | |
| 2006/0005132 A1 | 1/2006 | Herdeg, III | |
| 2006/0168188 A1* | 7/2006 | Dutton | H04M 3/5175 709/223 |
| 2007/0050844 A1 | 3/2007 | Lebel | |
| 2008/0301101 A1* | 12/2008 | Baratto | G06F 9/451 |
| 2009/0222727 A1 | 9/2009 | George et al. | |
| 2009/0249300 A1 | 10/2009 | Vainer et al. | |
| 2010/0095208 A1 | 4/2010 | White et al. | |
| 2010/0229112 A1 | 9/2010 | Ergan et al. | |
| 2010/0262589 A1 | 10/2010 | Gnech et al. | |
| 2010/0271478 A1* | 10/2010 | Oya | G06V 20/52 348/143 |
| 2011/0029665 A1* | 2/2011 | Wenig | H04L 67/01 709/224 |
| 2011/0173239 A1 | 7/2011 | Sayed et al. | |
| 2011/0173589 A1 | 7/2011 | Guttman et al. | |
| 2011/0191676 A1 | 8/2011 | Guttman et al. | |
| 2011/0246879 A1 | 10/2011 | White et al. | |
| 2012/0054715 A1 | 3/2012 | Welchman et al. | |
| 2012/0159324 A1 | 6/2012 | Chavez et al. | |
| 2012/0174069 A1 | 7/2012 | Zavatone | |
| 2013/0104041 A1 | 4/2013 | Seshagiri et al. | |
| 2013/0132833 A1 | 5/2013 | White et al. | |
| 2013/0159784 A1 | 6/2013 | Rossi | |
| 2014/0075371 A1* | 3/2014 | Carmi | G06F 9/451 715/781 |
| 2014/0137052 A1* | 5/2014 | Hernandez | G06F 11/3438 715/863 |
| 2014/0157109 A1 | 6/2014 | Huang et al. | |
| 2014/0373030 A1 | 12/2014 | Francis | |
| 2016/0188548 A1 | 6/2016 | Ciabarra, Jr. et al. | |
| 2018/0173375 A1 | 6/2018 | Webber et al. | |
| 2019/0004823 A1 | 1/2019 | Walker et al. | |
| 2019/0361572 A1 | 11/2019 | Webber et al. | |
| 2021/0055836 A1 | 2/2021 | Webber et al. | |
| 2022/0214772 A1 | 7/2022 | Webber et al. | |

* cited by examiner

EVALUATION OF INTERACTIONS WITH A USER INTERFACE

CROSS-REFERENCE TO RELATED APPLICATIONS

This is a continuation application of, and claims priority to, U.S. patent application Ser. No. 17/548,856, titled "EVALUATION OF INTERACTIONS WITH A USER INTERFACE," filed on Dec. 13, 2021, which is a continuation application of, and claims priority to, U.S. patent application Ser. No. 17/094,390, now U.S. Pat. No. 11,199,939, titled "EVALUATION OF INTERACTIONS WITH A USER INTERFACE," filed on Nov. 10, 2020, which is a continuation application of, and claims priority to, U.S. patent application Ser. No. 16/535,799, U.S. Pat. No. 10,838,571, titled "EVALUATION OF INTERACTIONS WITH A USER INTERFACE," filed on Aug. 8, 2019, which is a continuation application of, and claims priority to, U.S. patent application Ser. No. 15/896,887, now U.S. Pat. No. 10,402,041, titled "EVALUATION OF INTERACTIONS WITH A USER INTERFACE," filed on Feb. 14, 2018, which continuation application of, and claims priority to, U.S. patent application Ser. No. 15/695,951, now U.S. Pat. No. 9,927,947, titled "EVALUATION OF INTERACTIONS WITH A USER INTERFACE," filed on Sep. 5, 2017, which is a continuation application of, and claims priority to, U.S. patent application Ser. No. 14/587,481, now U.S. Pat. No. 9,766,769, titled "EVALUATION OF INTERACTIONS WITH A USER INTERFACE," filed on Dec. 31, 2014. The disclosure of the foregoing applications is incorporated herein by reference in their entirety for all purposes.

BACKGROUND

This specification relates to data processing evaluating user interfaces.

User interfaces facilitate user interaction with various resources and applications. For example, user interfaces generally include various interactive elements that enable a user to input data (e.g., using text boxes), make data selections (e.g., using radio buttons, check boxes, or drop down menus), navigate to resources (e.g., by interacting with an embedded link), and change visual aspects of the user interface (e.g., resizing the window, scrolling to other portions of a document, or using zoom controls). User satisfaction with a given website or application can depend on the user's experience interacting with the user interface.

SUMMARY

In general, one innovative aspect of the subject matter described in this specification can be embodied in methods that include for each of a plurality of different user sessions: accessing interface data specifying a structure of a user interface presented during the user session; accessing user interaction data specifying user interactions with the user interface during the user session; identifying a set of mutation events specifying changes to the structure of the user interface that occurred during the user session; generating, based on the interface data and the set of mutation events for the given user session, a plurality of user interface states specifying different structures of the user interface throughout the given user session; generating, based at least in part on the plurality of user interface states, playback data that present visual changes of the user interface corresponding to the set of mutation events that occurred during the user session; and generating, based on the user interaction data and contextual data corresponding to the user interactions, session activity data describing user interactions that occurred during the user session, wherein the contextual data is based on at least one of the user interface states; receiving a request for session information from a requesting device; and outputting at least a portion of the playback data and the session activity data and the requesting device. Other embodiments of this aspect include corresponding systems, apparatus, and computer programs, configured to perform the actions of the methods, encoded on computer storage devices.

These and other embodiments can each optionally include one or more of the following features. Generating playback data can include generating playback data that visually present user interactions with the user interface, the user interactions including at least one of a pointer movement, a user click, a user tap, a user swipe, a zoom, a scroll, a focus, or a text entry.

Accessing interface data can include obtaining an initial document object model (DOM) of a resource presented at a user device. Accessing user interaction data can include obtaining a list of user interactions with the resource and timestamps specifying when each of the user interactions occurred.

Generating a plurality of user interface states can include reconstituting, based on the initial DOM and the set of mutation events for the given user session, multiple document object models (DOMs) representing the structure of the user interface at various points throughout the given user session.

Generating session activity data can include: for each of a plurality of user interactions that occurred during a given user session: identifying, based on the user interaction data and from the multiple DOMs, a given DOM that represents a given structure of the user interface when the given user interaction occurred; identifying, based on the user interaction data, a node of the given DOM representing a user interface element with which user interaction occurred; identifying, from the given DOM, the contextual data specifying one or more attributes of the user interface element; and creating, based on the user interaction data, the identified node, and the contextual data, session activity data describing the given user interaction.

Generating session activity data for the given user session can include generating an activity list specifying, at least in part, user interactions and at least a portion of the contextual data for each of the user interactions, wherein the activity data cause the activity list to be presented concurrently with the visual changes presented by the playback data.

Playback data can cause a given activity from the activity list to be highlighted when the visual changes being presented during playback correspond to the given activity.

Methods can include the operations of determining, based on the interface data, that a portion of content presented in the user interface during a given user session is obtained from a specified network location; obtaining the portion of content from the specified network location; storing the portion of content from the specified network location. Generating playback data can include including the portion of content in the playback data.

Storing the portion of content can include storing the portion of content in association with a hash value computed based on the portion of content, and methods can include determining, for a subsequent user session, that the user interface includes content located at the specified network location; comparing the hash value to a newly computed hash value for the content located at the specified network location; determining, based on the comparison, that the content currently located at the specified network location differs from the portion of content previously obtained from the specified network location; obtaining the content from the specified network location; storing the content from the specified network location in association with the newly computed hash value; and including the content from the specified network location in playback data for the subsequent user session.

Generating session activity data can include generating an activity report that includes at least one of a total number of user sessions in which a given activity occurred, a portion of all user sessions in which the given activity occurred, a total number of user sessions in which a specified combination of activities occurred, or a portion of all user sessions in which the specified combination of activities occurred.

Methods can further include the operations of for each of one or more user sessions: obtaining publisher specified data corresponding to a user associated with the session, wherein the publisher specified data is independent of the interface data, user interaction data, and the set of mutation events; associating the publisher specified data with the session activity data for the user session; receiving a second request for session information; outputting, in response to the second request and for each user session, a state of the user at a time of the user session based on the publisher specified data.

Methods can further include the operations of providing, based on an aggregation of session activity data for a plurality of user sessions, analytic data specifying commonalities or differences between user sessions in which a specified activity occurred and user sessions in which the specified activity did not occur.

Receiving a request for session information from a requesting device can include receiving a request specifying a given user interface state, and methods can further include the operations of identifying sessions corresponding to the given user interface state, and wherein outputting at least a portion of the playback data and the session activity data and the requesting device comprises outputting playback data and session activity data for at least a portion of the sessions corresponding to the given user interface state.

Particular embodiments of the subject matter described in this specification can be implemented so as to realize one or more of the following advantages. User interactions with a user interface can be determined and evaluated without negatively impacting the user experience. Evaluation of the user interface can be used to modify the user interface to provide a better user experience. Evaluation of user interactions with the user interface can reveal difficulties that users have interacting with the user interface, and a publisher can playback each session of interest to evaluate how the user interface can be modified to reduce the difficulties users have interacting with the user interface. Customer service representatives can quickly resolve user inquiries regarding a user interface by playing back the user session that is the subject of the user inquiry. Publishers are provided with information regarding the scope of user interaction with various user interface elements and/or the scope of various conditions (e.g., failed content loads or aborted user sessions) by aggregating information acquired from multiple user sessions. Technology described in this document can facilitate evaluation of user interactions with user interfaces using less bandwidth and/or memory resources than would be required without these technologies. For example, selectively logging mutation events based on exclusion rules reduces the amount of data that a user device must record and/or upload. Additionally, using mathematical relationships (e.g., formulas) to represent sets of user interactions (e.g., mouse movements or other user interactions represented by multiple data points) reduces the amount of data that a user device must upload, thereby reducing the amount of bandwidth required to upload the data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Publishers (e.g., an entity that provides a user interface) generally want to make user interfaces user friendly so that users will have a positive experience. Having information about user interactions with a given user interface (e.g., a web page or an application interface) can help a publisher identify aspects of the user interface that can be changed to improve the user experience. This document discusses obtaining information related to user interactions with a user interface and processing that information to provide a publisher with data that the publisher can use to identify aspects of the user interface that may be modified to contribute to a positive user experience with the user interface. As discussed in detail below, the data provided to the publisher can include session activity data that describe user interactions with the user interface and/or playback data that present visual changes to the user interface during a given user session.

For example, the playback data for a given website can include data that show mouse movements, mouse hovers, clicks, and other user interactions with the user interface, as well as changes to the user interface (e.g., content that was loaded and/or removed from the user interface) that occurred while a user was interacting with and/or viewing the website. The session activity data can include an activity list that details various user interactions with various user interface elements while the user was interacting with and/or viewing the website. The session activity data can also include an activity report that can provide the publisher with an aggregate measure (e.g., total number or portion) of users the performed a specified interaction (e.g., performed a click on a specified button), an aggregate measure of users that failed to perform a specified interaction (e.g., not performing a click on a "continue" button), and/or aggregate measures of users that performed various combinations of interactions and failed to perform various combinations of user interactions.

As discussed below, the publisher is provided an interface that enables the publisher to request session information (e.g., session activity data and playback data) and playback user sessions that meet the criteria specified in the request. Thus, the publisher is provided information on how many (or what portion) of users performed (or didn't perform) one or more specified interactions, how many user sessions included a specified event, and/or view the playback of those user sessions. Many of the examples that follow refer to user interactions with a website, but aspects of the techniques described in this document are also applicable to evaluation of native application user interfaces (e.g., native applications installed on a mobile or tablet device).

Figure 1:
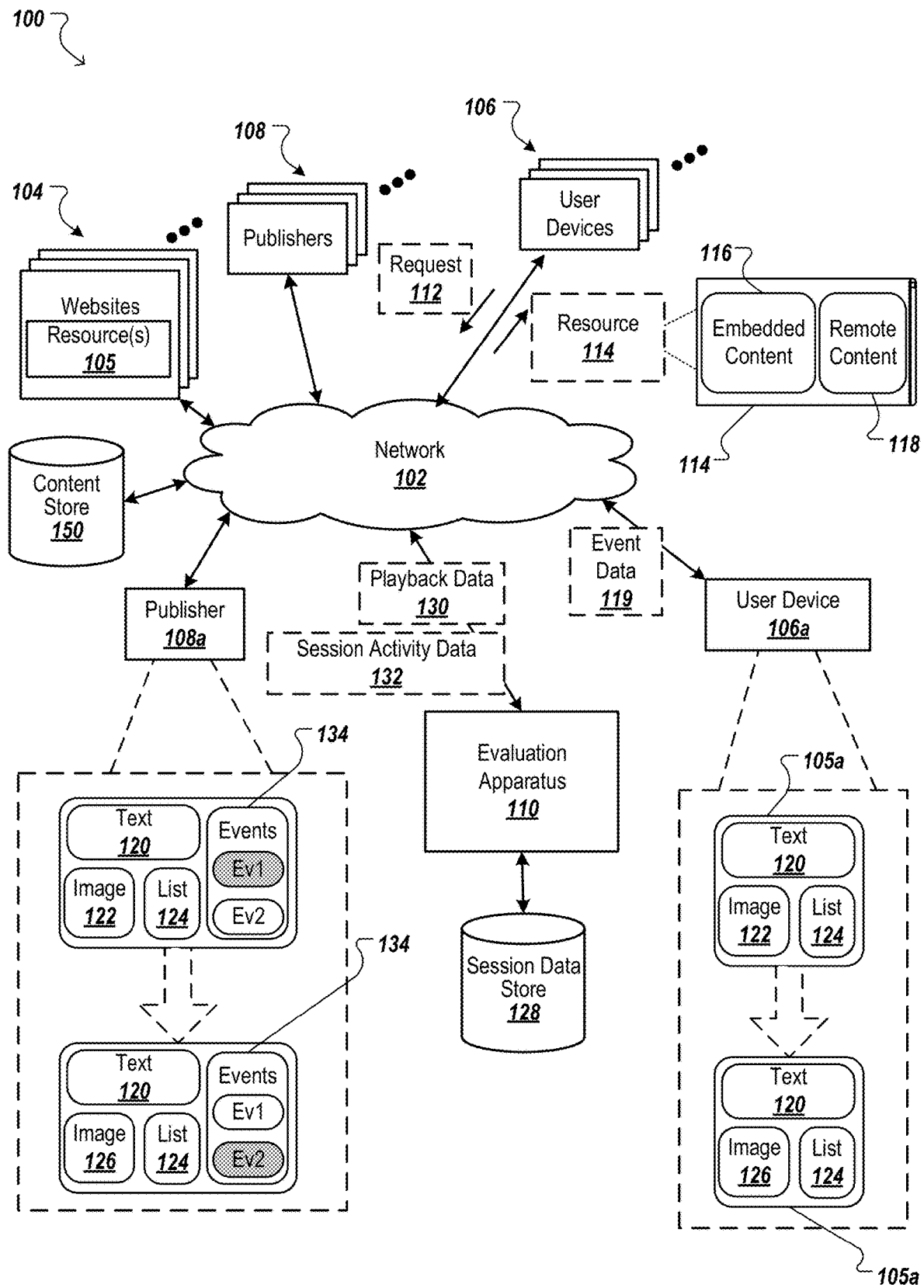
FIG. 1 is a block diagram of an example environment in which users interact with user interfaces.

FIG. 1 is a block diagram of an example environment 100 in which users interact with user interfaces. The example environment 100 includes a network 102, such as a local area network (LAN), a wide area network (WAN), the Internet, or a combination thereof. The network 102 connects websites 104, user devices 106, publishers 108, and an evaluation apparatus 110. The example environment 100 may include many different websites 104, user devices 106, and publishers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher 108, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a web page from a social network, or another resource 105. The data representing the requested resource 114 can include data that cause presentation of embedded content 116 (e.g., text that is included in the code of the resource) at the user device 106. The data representing the requested resource 114 can also include instructions that cause the user device 106 to request remote content 118 from a content store 150. The remote content can include, for example, images, content that is updated periodically, content used across multiple different resources, or content provided by third parties (e.g., other than the publisher). Thus, the remote content can be updated or changed without having to update the resource code.

The environment 100 includes an evaluation apparatus 110 that facilitates acquisition of event data 119 from the user devices 106. As used throughout this document, the phrase event data refers to data obtained from a user device 106 during a user session. The event data can include interface data, user interaction data, and mutation data. The interface data specify a structure of a user interface that is presented at a user device during the session. For example, when the user device 106a renders the resource 105a, the interface data can be an initial document object model (DOM) of the resource 105a that is first presented at a user device. In this example, the DOM would specify that the resource 105a initially presented text 120, an image 122, and a list of links 124 and include contextual data about each of these elements (e.g., text of each element, location of each element, visual characteristics of each element, etc.). The DOM can be provided to the evaluation apparatus 110 once the resource 105a is completely rendered by the user device 105a.

Additionally, or alternatively, the DOM can be reconstituted based on mutation data that are provided to the evaluation apparatus 110 as the resource 105a is rendered by the user device 106a. For example, the mutation data can specify each element that is rendered by the user device, and the mutation data can be provided to the evaluation apparatus 110 (e.g., either sequentially or in sets of mutation data that were accumulated over a specified time by the user device). Using the mutation data, the evaluation apparatus 110 can reconstitute the DOM in a manner similar to that performed by a browser. The mutation data can be obtained, for example, by inserting a mutation observer script in the code of the resource (or native application). The mutation of observer script can monitor the resource for changes to the structure of the resource, record mutation data representing the changes in local memory at the user device, and provide the mutation data to a specified location (e.g., the evaluation apparatus 110).

The user interaction data specify user interactions at the user device, and include user interactions with the elements of the user interface. The user interaction data can specify mouse movements, user clicks, mouse hovers, highlights, text inputs, and any other user interactions that are performed at the user device. For example, assume that a user clicks on an item in the list 124, in this example, the user interaction data will specify that a user click occurred and identify the element of the user interface that was clicked. The user interaction data can also include timestamp information and/or sequential numbering information specifying when each user interaction occurred so that the user interaction data can be coordinated with other data. For example, the user interaction data can specify an absolute time at which a given user interaction occurred and/or a number representing when a given user interaction occurred relative to other user interactions a set of user interactions (e.g., user interaction 50 out of 150 total user interactions.

The user interaction data can be obtained, for example, by inserting an interaction tracking script in the code of the resource (or native application). The interaction tracking script will monitor mouse movement, clicks, and other user actions. In the context of a tablet or other touchscreen device, the interaction tracking script monitor user taps, swipes, pinches, and other user interactions with the touchscreen device.

The mutation data specify changes to the structure of the user interface that occur during a user session. For example, assume that a user clicks on an item in the list 124, which causes the image 122 to be replaced by the image 126. In this example, the mutation observer script can detect the removal of image 122 and the addition of the image 126 in the user interface, and stored mutation data at the user device 106 specifying that the image 122 was removed from the user interface and that the image 126 was inserted into the user interface. Alternatively, or additionally, the mutation data can directly specify the replacement of the image 122 by the image 126 (e.g., rather than specifying both the remove mutation and the add mutation). Periodically, the user device 106 can upload (or otherwise transmit) the mutation data to the evaluation apparatus 110, which processes the mutation data as described in more detail below.

In some implementations, each user interface element is identified by a number (or a name) corresponding to the order in which the user device rendered the user interface elements. For example, assume that the item from the list 124 that was clicked was the last of 50 elements rendered by the user device when loading the resource 105a. In this example, the mutation data may specify that element 50 was removed from the resource 105a and element 51 (e.g., image 126) was inserted into the resource 105a (e.g., assuming that no other elements were rendered between the rendering of element 50 and the image 126). The mutation data can also include timestamp data, which can be used to correlate the mutation data with other data (e.g., user interaction data). The mutation data can continue to be provided to the evaluation apparatus 110 throughout the user session, such that the mutation data obtained by the evaluation apparatus represents all changes to the user interface over the user session.

In some implementations, the numbering representing the order of user interactions and the numbering representing the order in which the user device rendered the user interface elements are a same numbering sequence. In such implementations, the numbering provides a relative order of both changes to the user interface and user interactions with the user interface. For example, assume that a last page element rendered and given a number of x. Further assume that the next event was a user interaction with the user interface, which led to a subsequent change in the DOM. In this example, the user interaction could be assigned a number x+1 (or some other incremental amount other than 1), and the mutation data corresponding to the change in the DOM could be assigned a number x+2. Thus, the numbering scheme would indicate that the user interaction occurred between the rendering of the last page element and the change in the DOM.

As used throughout this document a user session is period of user interaction with a user interface. In the context of a website, the user session can begin when a user requests a first resource from a given domain (e.g., example.com) and can end when a session end condition is met. In the context of a native application the user session can begin when the user launches the native application and can end when a session end condition is met. The session end condition can be considered met when a specified amount of time elapses since a user interaction with a resource from the given domain or the native application. For example, if a user has not interacted with a resource from the given domain or the native application for 30 minutes (or some other amount of time), the session end condition can be considered to be met, thereby ending the session.

The session end condition can also be considered met when a session termination event occurs. The session termination event can be, for example, receipt of a session end message indicating that the user navigated away from the given domain or closed the browser, or a message specifying that the user closed the native application. Note that the session termination event may be stored at the user device 106 for some time (e.g., until the user reopens the browser or again launches the native application) prior to the user device 106 submitting the session end message to the evaluation apparatus 110.

The evaluation apparatus 110 receives the event data 119 from the user device and stores the event data 119 in a session data store 128. As discussed in more detail with reference to FIG. 2, the evaluation apparatus 110 can, for each user session, generate playback data 130 and session activity data 132 for the session. The evaluation apparatus 110 provides the playback data 130 and the session activity data 132 to the publisher 108a that provides (or otherwise has control over) the resource 105a.

The playback data 130 present the publisher 108a with visual changes to the resource 105a during the user session and other user activity (e.g., mouse movements) that occurred during the session. At least a portion of the visual changes to the resource 105a correspond to the mutation data for the user session. Continuing with the example above, the playback data 130 can show the publisher 108a mouse movement over the resource 105a, a user click on an item from the list 124, and the replacement of the image 122 with the image 126. In this example, the replacement of the image 122 with the image 126 correspond to the mutation data specifying the removal and addition of the images 122 and 126, respectively.

The session activity data can present to the publisher a list of events 134 that occurred during the user session. For example, the list of events can specify that two events Ev1 and Ev2 occurred during the user session. Ev1 can correspond to the initial loading of the resource, and Ev2 can correspond to the click on the item from the list 124. As playback of the user session is presented (e.g., showing mouse movements and visual changes) the list of events can be highlighted to show which event corresponds to the visual changes that are being presented by the playback data. For example, upon initial playback of the user session, Ev1 can be highlighted indicating that the visual representation of the resource 105a corresponds to the initial loading of the resource 105a. Once playback of the user session reaches the point where the user clicked on the item from the list 124, Ev2 can be highlighted indicating that the replacement of the image 122 with the image 126 corresponds with the click on the item from the list 124. As discussed in more detail below, the session activity data can also include contextual data corresponding to the user click on the item from the list (e.g., text of the clicked item, which changes to the resource 105a correspond to the user click, and/or requests for web pages (or other user interfaces, such as application user interfaces) that occurred during the user session.

Figure 2:
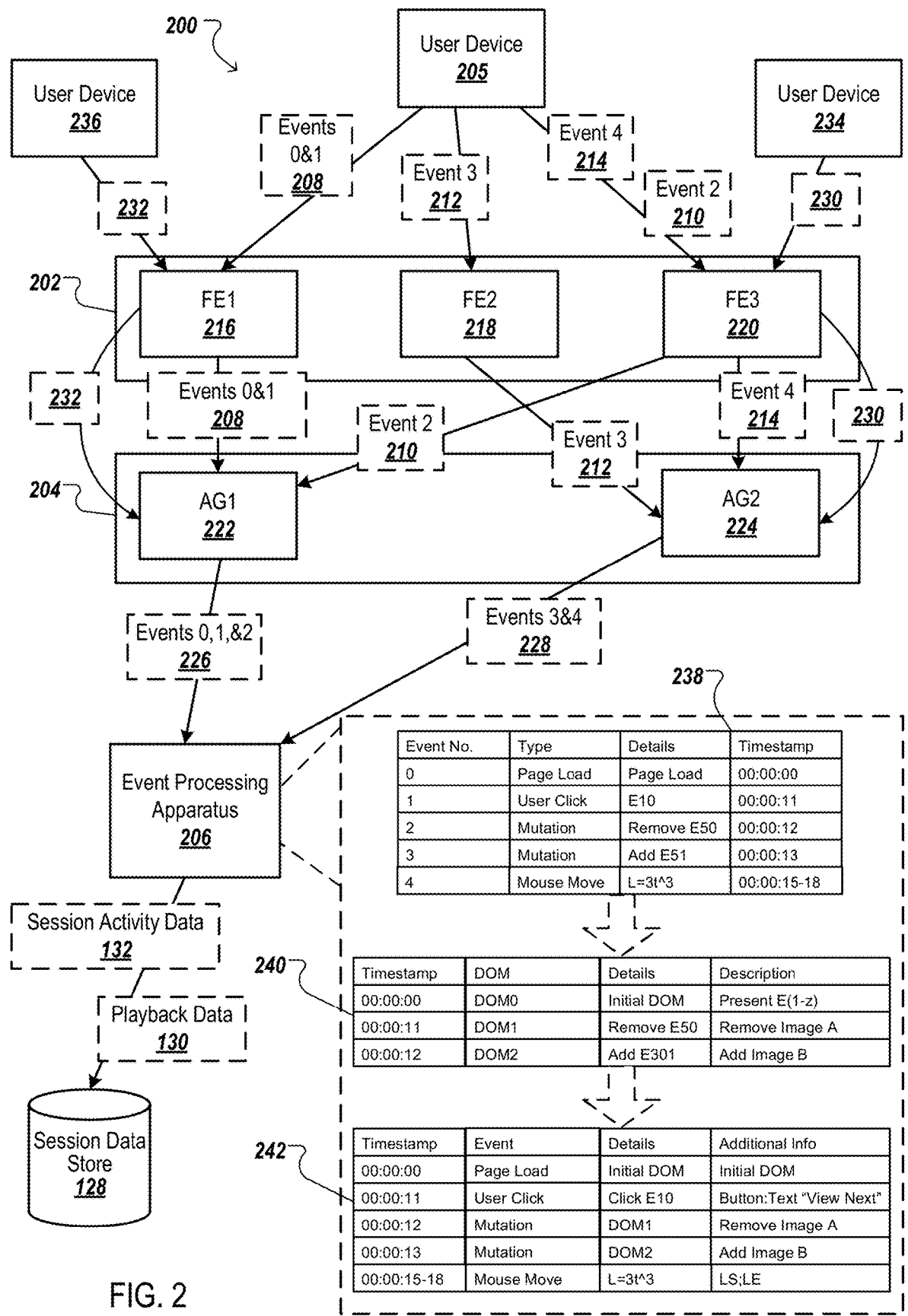
FIG. 2 is an example data flow for creating playback data and session activity data.

FIG. 2 is an example data flow 200 for creating playback data and session activity data. The example data flow 200 also shows various elements that can be included in an evaluation apparatus 110 of FIG. 1. For example, the evaluation apparatus 110 can include a set of front end devices 202, a set of aggregators 204, and an event processing apparatus 206. In some implementations, the evaluation apparatus 110 includes only a proper subset (i.e., fewer than all) of the set of front end devices 202, the set of aggregators 204, and the event processing apparatus 206. For example, the evaluation apparatus 110 can include only the event processing apparatus 206, which can receive and process data similar to that provided by the set of aggregators 204.

The data flow 200 can begin with the set of front end devices 202 receiving event data from a user device 205. The set of front end devices 202 can receive different sets of event data 208, 210, 212, 214 from the user device 205 at various points in time. For example, the set of event data 208 can include data representing "event 0" and "event 1" (collectively "events 1&2"), which can be the first two events in a given user session. Similarly, the set of event data 210 can include data representing "event 2" (e.g., the second event that occurred during the given user session), while the set of event data 212 and the set of event data 214 can respectively include data representing "event 3" and "event 4," which may respectively be the third and fourth events that occurred during the given user session.

In some implementations, the different sets of event data 208, 210, 212, and 214 each include raw event data (e.g., interaction data and/or mutation data that have not yet been processed) for one or more events (e.g., an interaction event and/or a mutation event). An interaction event corresponds to a user interaction with the user interface (e.g., a mouse movement, click, tap on touchscreen, pinch, swipe, etc.) and is represented by interaction data. A mutation event corresponds to a structural change to the user interface (e.g., a DOM change or a change to the user interface structure of a native application) and is represented by mutation data.

The raw event data can be, for example, data captured by the user device using a mutation observer and/or an interaction tracking script. The raw event data (e.g., interaction data) for a user interaction (e.g., a user click of a button) can include data specifying one or more of a session identifier for the user session, a timestamp (e.g., an absolute time indicator and/or a relative time indicator) corresponding to a time at which the user interaction occurred, and/or the user interaction (e.g., the user click) and data specifying the user interface element with which the user interaction occurred (e.g., the button that was clicked).

In some implementations, the user interface element will be identified in the raw event data based on a number that has been assigned to the user interface element. Continuing with the example above, the raw event data corresponding to the user click of the button can be "ID100 click" indicating that a user click on element 100 was detected. As discussed above, during a given user session, each user interface element can be assigned a number when the user interface element is rendered by the user device. In this example, the ID100 can indicate that the user interface element clicked by the user was the 100th user interface element rendered (or displayed) during the user session. However, the raw event data may not include contextual information regarding the element 100. For example, the raw event data may not specify that the element 100 is a button, a location of the element 100, or any visual characteristics of the element 100 (e.g., text associated with the element 100). As discussed in more detail below, this information can be identified by the event processing apparatus 206 during processing of the raw event data.

The raw event data corresponding to a change to the structure of the user interface (e.g., mutation data) can include data specifying one or more of a session identifier for the user session, a timestamp (e.g., an absolute time indicator and/or a relative time indicator) corresponding to a time at which the structural of the user interface occurred, and/or the structural change to the user interface. For example, during an initial page load, each element of user interface that is rendered can be detected, and the rendering of each element can be considered a separate event (e.g., a series of different add content (or node) mutation events). After the initial page load, each change to the user interface (e.g., content additions, content replacements, content removals, content expansions, text input, color changes, zoom events, page scrolls, cascading style sheet ("CSS") loads, and/or any other changes to the structure of the user interface) can be identified as a separate mutation event. The raw event data (e.g., mutation data) representing each mutation event can specify the user interface mutation (e.g., an element add or removal) and the user interface element(s) involved in the mutation event.

Continuing with the example above, assume that the user click of the user interface element 100 resulted in removal of an image assigned ID200 that was presented in the user interface prior to the user click, and resulted in addition of an image assigned ID300 in the user interface subsequent to the user click. In this example, the raw event data specifying the change to the structure of the user interface can include a mutation event "ID200 remove" and a mutation event "ID300 add" along with contextual information regarding the insertion of the image associated with ID300 in the user interface. The contextual data can include, for example, a location of the image in the user interface, a size of the image, text associated with the image, and/or any other information corresponding to insertion of the image within the user interface. In some implementations, the mutation data for a given mutation event can correspond to a hierarchical tree having a node representing the user interface element associated with the mutation event, sub nodes representing contextual data corresponding to the user interface element, and/or data specifying where the hierarchical tree is located within a larger tree representing the structure of the user interface.

In some implementations, the mutation observer can be configured to exclude a specified set of events from the raw event data. For example, a publisher can create an exclusion rule specifying that information inserted into particular fields (or other user interaction information) are to not be uploaded by the mutation observer. In this example, the mutation observer will determine, based on the exclusion rule, that information inserted into particular fields will not be uploaded. In response to this determination, the mutation observer can prevent data inserted into the particular fields from being uploaded. In some implementations, the mutation observer will disable keystroke recording when the particular fields are focused (e.g., when a cursor is placed in the particular fields). In some implementations, the mutation observer can either not store raw event data corresponding to the information inserted into the particular fields, or remove any raw event data corresponding to the information before uploading the raw event data. Publishers can create various exclusion rules that can prevent certain types of user interactions from being stored, thereby providing publishers control over what information is collected or not collected. Preventing the collection and/or reporting of various raw event data not only provides potential privacy protections, but also reduces the amount of bandwidth required to upload the raw event data as well as the amount of memory required to store the raw event data (e.g., relative to filtering the raw event data after uploading).

As illustrated by FIG. 2, a single set of event data can include data representing multiple events or a single set event data can include data representing just a single event. For example, the set of event data 208 includes data representing both event 0 and event 1, while the sets of event data 210, 212, and 214 each include data representing only a single event. In some implementations, the scripts that detect mutation events and user interactions record any detected mutation events and user interactions over a specified period, and then transmit any raw event data corresponding to the detected events at the end of the specified period.

The specified period may be based on a length of time or an occurrence of a number of the events. For example, the scripts can include instructions that cause the user device 205 to transmit a set of event data every second (or some other amount of time), or can include instructions that cause the user device to transmit a set of event data after E events (e.g., where E can be a specified integer). The specified period could also be based on an amount of data stored since the last set of event data was transmitted by the user device 205. For example, to prevent the event data from utilizing a large portion of memory at the user device 205, the scripts may include instructions that cause the user device 205 to transmit a set of event data when a specified portion of the memory has been used to store event data at the user device 205.

In some implementations, the user device 205 transmits event data to the set of front end devices 202. The set of front end devices 202 can include one or more data processing apparatus (e.g., computers or servers) that collect raw event data from user devices and forward the raw event data to a set of aggregators 204.

The set of front end devices 202 may include multiple front end devices (e.g. 216, 218, and/or 220) to help ensure that a front end device is available to receive event data from a user device (e.g. 205) when the user device is ready to upload the event data for processing. For example, when multiple front end devices 216, 218, and 220 are included in the set of front end devices 202, front end devices 216 and 218 may remain available to accept event data in the event that the front end device 220 goes off-line (e.g., is powered down or is unreachable over a network) or is otherwise unavailable to accept event data from user devices (e.g., due to network latencies, bandwidth restrictions, or availability of processing resources).

In some implementations, the set of front end devices 202 do not process the event data received from the user devices, but rather simply forward the received event data to the set of aggregators 204. Forwarding the event data in this manner helps reduce the likelihood that a user device will be unable to upload event data due to unavailability of a front end device, which can also reduce the storage and/or processing requirements of the user device.

The set of aggregators 204 can include one or more data processing apparatus (e.g., computers or servers) that obtain the raw event data from the set of front end devices 202 and prepare the event data for transmission to the event processing apparatus 206. In some implementations, the set of aggregators 204 identify event data that correspond to the same user session and group that data together for transmission to the event processing apparatus 206. For example, aggregator 222 ("AG1") may receive event data 208 and event data 210 from the front end device 216 and the front end device 220, respectively, while aggregator 224 ("AG2") may receive event data 212 and event data 214 from the front end device 218 and the front end device 220, respectively. In this example, the aggregator 222 can group the event data 208 and the event data 210 together in an event group 226 that the aggregator 222 transmits to the event processing apparatus 206 for processing. Similarly, the aggregator 224 can group the event data 212 and the event data 214 together in an event group 228 that the aggregator 224 transmits to the event processing apparatus 206 for processing.

As noted above, the set of aggregators 204 can group event data for a same user session into an event group that is transmitted to the event processing apparatus 206. In some implementations, this grouping is performed by identifying a session identifier that is included in the event data received from the user device 205 (e.g., by way of the set of front end devices 202). For example, on a periodic basis, each aggregator can identify the session identifier that is associated with each set of event data (e.g., 208, 210, 212, and 214), and group together those set of event data that have matching session identifiers (e.g., the same session identifiers or session identifiers having at least a specified level of similarity to each other). In the example illustrated by FIG. 2, the aggregator 222 can determine that the session identifier included in the event data 208 matches the session identifier included in the event data 210, and include those two sets of events in the event group 226. Similarly, the aggregator 224 can determine that the session identifier included in the event data 212 matches the session identifier included in the event data 214, and include those two sets of events in the event group 228.

Each of the aggregators 222 and 224 may also respectively receive event data 230 and event data 232 from user devices 234 and 236, as illustrated by FIG. 2. The event data 230 will have a different session identifier than the session identifier that is included in the event data 214 and the event data 212, such that the aggregator 224 will determine that the event data 230 is for a different user session than the event data 212 and 214. Therefore, the aggregator 224 will not include the event data 230 in the event group 228, but can include the event data 230 in another event group (not shown) corresponding to the session identifier included in the event data 230.

Similarly, the event data 232 will have a different session identifier than the session identifier that is included in the event data 208 and event data 210. Such that the aggregator 222 will determine that the event data 232 is for a different user session than the event data 208 and 210. Therefore, the aggregator 222 will not include the event data 232 in the event group 226, but can include the event data 230 to another event group (not shown) corresponding to the session identifier included in the event data 232.

The event processing apparatus 206 receives the event group 226 and the event group 228 from the aggregator 222 and the aggregator 224, respectively. In some implementations, the event processing apparatus 206 will store event data from received event groups until a session end condition has been met, as discussed above with reference to FIG. 1. When the session and condition has been met, or the event processing apparatus 206 otherwise determines that it is time to process the event data, the event processing apparatus proceeds to re-create the session using the event data.

For example, the event processing apparatus 206 can begin by identifying each event from the event data and identifying, from the event data, one or more of the type of event, details regarding the event, and/or timestamp corresponding to the event as illustrated by table 238. In the table 238, the events have been ordered based on the event number, which can specify a relative order in which each of the events occurred. For example, event 0 is the first event that occurred during the user session, and corresponds to an initial page load. For purposes of this example, the initial page load includes (and can reference) each mutation event (e.g., the rendering of each element of the user interface) that occurred during the initial page load.

Meanwhile, event 1 (corresponding to a user click) occurred after event 0, event 2 (corresponding to removal of a user interface element) occurred after even 1, event 3 (corresponding to insertion of a user interface element)

occurred after event 2, and event 4 (corresponding to a mouse movement) occurred after event 3. Each of these events are listed in ascending order according to their event number. Each of these events also has a corresponding timestamp indicating an absolute time (e.g., GMT) when each of the events occurred.

Using the event data in the table 238, the event processing apparatus 206 can reconstitute the structure of the user interface throughout the user session. For example, using the mutation events corresponding to the page load (e.g., event 0), the event processing apparatus 206 can determine the structure of the user interface that resulted from the initial page load (and at various points during the initial page load). In some implementations, the initial structure can be reconstituted by reconstituting the initial DOM of the resource in a manner similar to that performed by browsers to render and present the online resource at the user device. With reference to FIG. 2, the initial DOM of the resource is labeled DOM0 in the table 240, and corresponds to the presentation of user interface elements 1-z (e.g., as represented by E(1-z)).

Once the event processing apparatus 206 has reconstituted the initial structure of the user interface ("initial structure"), the event processing apparatus 206 can use that initial structure and subsequent mutation events to reconstitute the user interface structure at other points in the user session. For example, based on the data corresponding to event 2, the event processing apparatus 206 can determine that a next state of the user interface differed from the initial structure based on the event data 210 specifying the removal of user interface element E50. Therefore, the event processing apparatus 206 can create a next instance of the user interface structure by removing portions of the initial structure (e.g., nodes) corresponding to the user interface element E50. This second instance of the user interface structure is labeled DOM1.

The event processing apparatus 206 can continue to reconstitute subsequent states of the user interface by continuing to modify a last determined state of the user interface structure with subsequent event data. For example, the event processing apparatus 206 can modify DOM1 using the event data 212 corresponding to event 3 to obtain DOM2, which is a next state of the user interface structure during the user session. In this example, the event processing apparatus 206 can arrive at the structure of DOM2 by adding one or more nodes representing user interface element E301 to DOM1. Each state of the user interface structure can be reconstituted in a similar manner with additional event data. Each of the reconstituted user interface states (e.g., DOMs) can be stored in a data store, such as the session data store.

In the context of a native application (e.g., a mobile application), the processing performed by the event processing apparatus can be performed in a similar manner. However, the event data reported by the native application may have a different format and/or different event identifiers than those used to render an online resource. For example, in the context of a native application, code that performs operations similar to the mutation observer and the interaction tracking script will be included in the code of the native application and will describe changes to the user interface of the native application and user interactions with the user interface of the native application. Because the structure of the native application user interface will likely differ from the structure of a website, the mutation data and/or user interaction data reported by the user device may not match the mutation data and/or user interaction data that are reported for a website or another set of resources. Therefore, the event processing apparatus 206 can utilize an application to resource mapping to reformat (or translate) the event data received from the native application to a format that can be used to reconstitute the various states of the native application in a manner similar to that described above.

The event processing apparatus 206 can analyze the event data to identify specified events and obtain contextual data related to the events. For example, the event processing apparatus 206 can identify the user click of event 1, and analyze the event data to obtain contextual data related to that user click. In some implementations, the contextual data related to a given event can be identified based, at least in part, on a user interface element that is associated with the event. For example, with reference to the user click of event 1, the interaction data indicates that the user click was a click on user interface element E10. While the user interface element may be identified as element E10 (or ID10) in the interaction data, the interaction data may not include other information that can be used to describe (or provide context about) the user interface element E10.

In some implementations, the event processing apparatus 206 can obtain contextual data corresponding to user interactions from other event data and/or the reconstituted user interface structures that have been stored for the user session. For example, with reference to a given event, the event processing apparatus 206 can determine the state of the user interface at the time of the given event and use the state of the user interface structure at that time to obtain contextual data for the given event.

The event processing apparatus 206 can identify the state of the user interface at the time of a given event, for example, based on the event numbers and/or timestamps corresponding to the given event and a most recent mutation event preceding the given event. For example, with reference again to the user click of event 1, the event processing apparatus can determine, based on the timestamps (or event numbers), that the initial page load was the most recent mutation event prior to the user click. Therefore, the event processing apparatus 206 can identify DOM0 as the structure of the user interface at the time of the user click.

Once the event processing apparatus 206 has identified the state of the user interface at the time of a given event, the event processing apparatus 206 can use that identified state to obtain contextual data related to the given event. For example, the event processing apparatus 206 can identify the user interface element E10 in DOM0, and then identify other portions (e.g., nodes) of the DOM0 that provide contextual data about the interface element E10.

For purposes of this example, assume that the DOM0 is formatted as a hierarchical data structure (e.g., a tree) in which each node is hierarchically associated with other related nodes. In this example, the node corresponding to interface element E10 may have a child node identifying the interface element E10 as a "button," and a grandchild node of the interface element E10 may specify that the text "View Next" is presented in the interface element E10. Thus, based on the structure of DOM0, the event processing apparatus 206 can determine that the interface element E10 is a button that includes the text "next image," and store this information as contextual data for the user click of event 1, as illustrated by table 242 (e.g., Button:Text "View Next"). Note that the example above describes obtaining contextual data from child nodes of the user interface element, but contextual data can also be obtained from parent nodes of the user interface element.

In some implementations, the event processing apparatus 206 combines the user interaction data and the contextual data to create session activity data 132 for at least some of the user interactions. The session activity data 132 can specify, for example, a list of various user actions (e.g., clicks or resource requests) that occurred and any contextual data corresponding to the user interaction. As described in more detail below, the session activity data 132 can be provided to a publisher in response to a request for session information. The session activity data 132 are discussed in more detail below with reference to FIG. 3.

The event processing apparatus 206 can create playback data 130 that present visual changes to the user interface throughout a given session. The playback data 130 created by the event processing apparatus 206 for a given session can correspond to the events (e.g., mutations and/or user interactions) that occurred during the given session. For example, the event processing apparatus 206 can create playback data 130 that when executed by a user device present visual changes to the user interface that correspond to (e.g. were caused by) events listed in the table 242. For instance, execution of the playback data 130 can replay, at a user device (e.g., a publisher device), the initial page load using the reconstituted initial DOM. Execution of the playback data 130 can also replay the removal of Image A using DOM1, and replay the addition of Image B using DOM2. As used throughout this document, the term "replay" refers to a multimedia presentation of a previous session.

In some implementations, the playback data 130 can provide a "real-time" replay of a given session. In such implementations, the initial page load would be presented at the beginning of the replay, the removal of Image A would be presented 12 seconds after the initial page load, and the addition of Image B would be presented 13 seconds after the initial page load. The replay of given session can also be scaled, for example, so that the presentation of the visual changes to the user interface in either faster, or slower, then they actually occurred during the given session. In some implementations, the speed of the replay of a given session can be controlled by a publisher viewing the given session (e.g., using fast-forward or rewind controls).

The playback data 130 can also cause visual presentation of mouse movements and/or user clicks. In some implementations, the location of a user click can be visually represented by the presentation of a shaded (or colored) area at the location of the user click. For example, with reference to the table 242, the playback data 130 can include instructions that cause presentation of a shaded circle (or another shape) on the "View Next" button 11 seconds after the initial page load to visually convey the performance of the user click on that button, as illustrated below with reference to FIG. 3.

With reference to mouse movements, the playback data 130 can include data that represent a path of the mouse movement over a period of time. For example, the mouse movement listed in the table 242 is shown as occurring from 15 seconds after the initial page load until 18 seconds after the initial page load. In this example, the relationship $L=3t^3$ represents the path taken by the mouse over this time period. The playback data 130 can also include data specifying a starting location LS and an ending location LE corresponding to the mouse movement. Thus, the data representing the mouse movement indicates that at 15 seconds after the page load the mouse pointer is located at the starting location LS, traveled along a path represented by the relationship $L=3t^3$, and reached the ending location LE 18 seconds after the page load. The event processing apparatus 206 can create the playback data 130 to include instructions that cause presentation of a mouse pointer that moves across the user interface according to the data representing the mouse movement. Accordingly, mouse movements performed by a user during a user session can be presented during replay of the user session.

In some implementations, the data representing the mouse movements can be obtained with the sets of event data (e.g., 208, 210, 212, 214) that are received from the user device 205. For example, during the user session the interaction tracking script can cause the user device 205 to monitor mouse movements and store data corresponding to the mouse movements. The user device 205 can either upload all of the stored data corresponding to the mouse movements (e.g., data representing each location at which the mouse was detected) or the user device 205 can reduce the amount of data that is uploaded, which also reduces the amount of bandwidth required to upload the data corresponding to the mouse movements. The amount of data that is uploaded can be reduced, for example, by first creating an alternative representation of the mouse movements and uploading that alternative representation.

For example, the user device 205 can segment the stored data corresponding to the mouse movements and determine, for each segment, a mathematical relationship that represents the mouse movement corresponding to that segment. The user device 205 can then upload the mathematical relationship for each segment and any data necessary to re-create the mouse movement (e.g., the starting location, a time corresponding to the beginning of the segment, the ending location, and/or a time corresponding to the end of the segment). If all of the stored data corresponding to the mouse movement is uploaded by the user device 205, the event processing apparatus 206 can perform similar processing on the data, as described above, to reduce storage requirements for data representing the mouse movements.

In some implementations, the event processing apparatus 206 creates an association between at least a portion of the playback data 130 and the session activity data 132. For example, the event processing apparatus 206 can associate the portion of the session activity data representing the user click in the table 242 with playback data that will cause presentation of the visual indication of the user click (e.g., a shaded circle). Similarly, the event processing apparatus 206 can associate a portion of the session activity data representing the user click with the removal of Image A and/or the addition of Image B. The association between the playback data 130 and the session activity data 132 enables a visual indication of user interactions that corresponds to visual changes to the user interface, as illustrated below with reference to FIG. 3. For instance, text specifying the user click and/or contextual data related to the user click can be highlighted during a portion of the session replay corresponding to the user click.

In some implementations, the session activity data and/or playback data are indexed to facilitate searches for specified user interactions or events. For example, multidimensional indexing can be performed so that user sessions during which a given user interaction (or other event) occurred can be identified for a publisher, as discussed in more detail below with reference to FIG. 3. In some implementations, the indexing can be based on a state of the user interface to facilitate searching of session activity data and/or playback data based on user interface state information. For example, session activity data and/or playback data can be indexed according to a version of the user interface being used (e.g., as represented by a given DOM) or a given user interface element that was presented in the user interface. This information can then be used to identify those sessions, session activity data, and/or playback data based on a query specifying a user interface state. The indexed data can be stored, for example, in the session data store 128 or another data store (e.g. a separate index).

Figure 3:
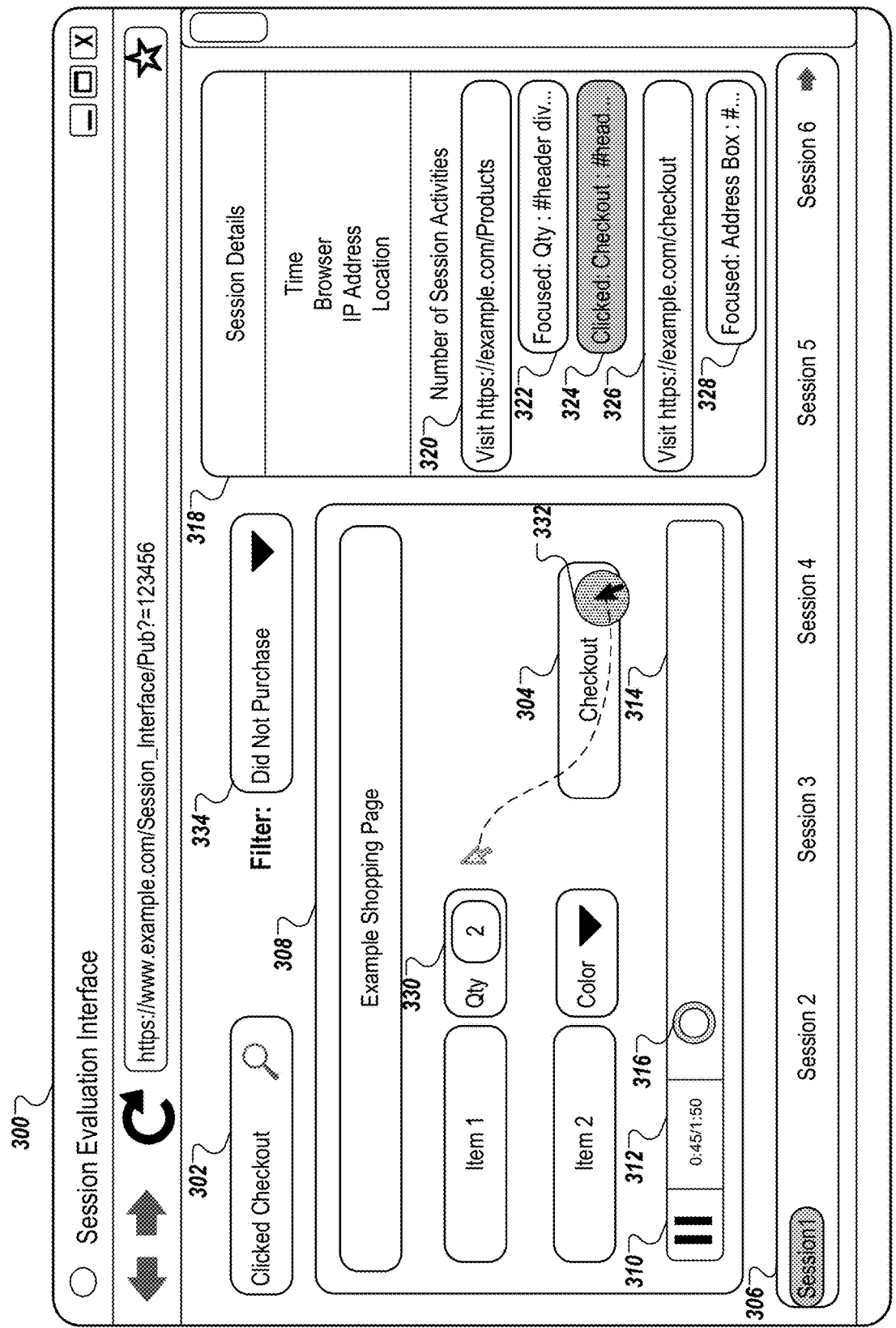
FIG. 3 is an illustration of an example user interface for replaying a session.

FIG. 3 is an illustration of an example user interface 300 for replaying a session. The user interface 300 includes a search field 302 that receives search criteria for identifying sessions. For example, assume that a publisher is interested in identifying and/or viewing sessions during which a user clicked a checkout button 304 of a given website (or native application) can enter the search phrase "clicked checkout" in the search field 302. Upon submission of the search phrase (e.g., inputting and enter command or clicking on a submission button), a request for session information is transmitted to the evaluation apparatus 110, which may include a search apparatus. The request for session information can include, for example, the search phrase, and identity of the publisher requesting the session information, and/or other information that provides context associated with the request.

In response to receiving the request for session information, the evaluation apparatus 110 can use the search phrase "clicked checkout" to identify one or more sessions during which a user clicked the checkout button 304 of the given website. In some implementations, the evaluation apparatus 110 identifies sessions responsive to the search phrase from an index of user sessions. For example, the index may include one or more entries associating the user action "click" and the user interface element "checkout button" with sessions during which a user clicked on the "checkout" button 304.

The evaluation apparatus 110 provides data identifying sessions responsive to the request for session information to the requesting device. In some implementations, the evaluation apparatus 110 can respond to the request for session information by providing data about one or more sessions that were identified based on the search phrase. Continuing with the example above, the evaluation apparatus 110 can provide a list of sessions 306 that were identified from the index based on the search phrase "clicked checkout." As illustrated by FIG. 3, the sessions in which a user clicked a checkout button include Session 1, Session 2, Session 3, Session 4, Session 5, and Session 6.

The evaluation apparatus 110 can also provide playback data and session activity data for one or more of the identified sessions in response to the request for session information. For example, as illustrated by FIG. 3 Session 1 is shaded, indicating that playback data for Session 1 is available for replay, and that session activity data for Session 1 are available for presentation.

The user interface 300 includes a playback region 308 in which previous sessions are replayed based on the playback data. The playback region 308 includes a playback bar, which includes a play/pause portion 310, a counter 312, and a slider portion 314. The play/pause portion 310 enables a publisher to start and stop replay of the session by interacting with the play/pause portion 310. The counter 312 provides a total duration of the session (e.g., 1 minute 50 seconds) and a portion of the session that is currently being presented (e.g., 45 seconds). The slider portion 314 enables a publisher to quickly move to other portions of the session by sliding a sliding element 316 within the slider portion 314. Continuing with the example above, the playback region 308 is replaying Session 1, as indicated by the shading of Session 1 in the list of sessions.

The user interface 300 includes a session activity region 318 in which activities that occurred during the session being replayed are presented based on the session activity data. For example, the session activity region 318 presents information such as a time at which the session being replayed occurred (e.g., a day, date, time of day, and/or year), a type of browser that was used to conduct the user session, an Internet Protocol (IP) Address of a device at which the user session occurred, and/or a geographic location of the user device at which the user session occurred. The session activity region 318 can also present a number of activities (e.g., a number of clicks, focuses, page navigations, or other user interactions) that occur during the session.

The session activity region 318 also identifies and/or outlines various activities that occurred during the user session being replayed. For example, the session activity region 318 specifies that, during the session being replayed in the playback region 308 the user navigated to example-.com/products 320, focused on a Qty element within the page 322, clicked the checkout button 324, navigated to example.com/checkout 326, and focused on an address box 328. The activities listed in the session activity region 318 can be arranged in the order in which they occur during the session. For example, the activity 320 occurred prior to the activities 322, 324, 326, and 328. Additionally, the activities listed in the session activity region 318 can be visibly represented in a hierarchical manner. For example, each of the activities 322 and 324 are offset to the right relative to the activity 320, thereby indicating that the activities 322 and 324 occurred during the visit to example.com/products 320.

The list of activities 318 can also provide contextual data regarding the activity. For example, activity 322 indicates that the user interaction "focus" occurred with the Qty user interface element 330. The list of activities 318 can also provide information from the structure of the user interface related to each activity. For example, each activity can include information from nodes associated with the activity from a hierarchical representation of the user interface structure (e.g., from a DOM). In a particular example, activity 322 shows a portion of the DOM nodes that provide contextual information about the Qty user interface element 330 (e.g., #header div . . . ). In some implementations, user interaction with the activity 322 will cause presentation of additional contextual information that is not presented in the list of activities 318 (e.g., a full set of DOM nodes that provide information related to the activity).

As replay of the session proceeds in the replay region 308, activity corresponding to the portion of the replay being presented can be highlighted. For example, after the user focuses on the Qty element 330, the user clicked on the checkout button 304. As the replay shows the mouse moving from near the Qty element 330 to the checkout button 304 (as illustrated by the dashed line), the activity 324 can be shaded (or highlighted) indicating the session activity that corresponds to the portion of the session currently being replayed. When the replay of the session reaches a point at which the user clicked the checkout button 304, the playback data can cause a shaded circle 332 to be presented, thereby visually conveying to the publisher that the user click occurred and a location of the user click on the checkout button 304. Similar animations can be used to visually convey to the publisher that other interactions occurred. For example, with reference to a touchscreen device, a similar shaded circle can be used to visually convey the occurrence of a user tap, and elongated shading animation can be used to illustrate a user swipe or other finger movement on the touchscreen.

As discussed above, a publisher can request replay of one of the other sessions (e.g., Session 2) from the user interface 300 (or another user interface). For example, user interaction with (e.g., a click of) Session 2 in the list of sessions 306 can initiate a request for session information about Session 2. In response to the request, the evaluation apparatus 110 can output, to the requesting device, playback data and session activity data related to Session 2. Upon receipt of the playback data and session activity data, the requesting device can replay Session 2 in the replay region 308, and present information about the activities that occurred during Session 2 in the session activity region 318.

In some implementations, the user interface 300 can include a filter element 334. The filter element 334 and enables a publisher to filter sessions identified using, for example, the submitted search phrase. For example, a publisher may be interested in identifying only the sessions during which a user clicked on the checkout button 304, but did not ultimately make a purchase. In this example, the user can submit the search phrase "clicked checkout," and interact with the filter element 334 to select a filter that identifies only those sessions during which the user did not make a purchase (e.g., by clicking on a drop-down button and selecting the "did not purchase" option). This enables the publisher to quickly identify sessions of interest, and/or identify what might have prevented these users from making a purchase (e.g., issues with the user interface).

An example filter is provided here for purposes of illustration, but various other filters can be used and specified as desired. For example, publishers may be interested in evaluating only those sessions that were performed in a specific geographic region (e.g. Southeast United States, Central America, Europe) or only those sessions during which a user terminated the session prior to some specified duration (e.g., within 2 minutes). As discussed in more detail below, providing filters such as these and/or analytic information related to sessions identified using filters can provide a publisher with insight regarding how to better format their user interface and/or achieve specific business goals (e.g., increase sales).

Figure 4:
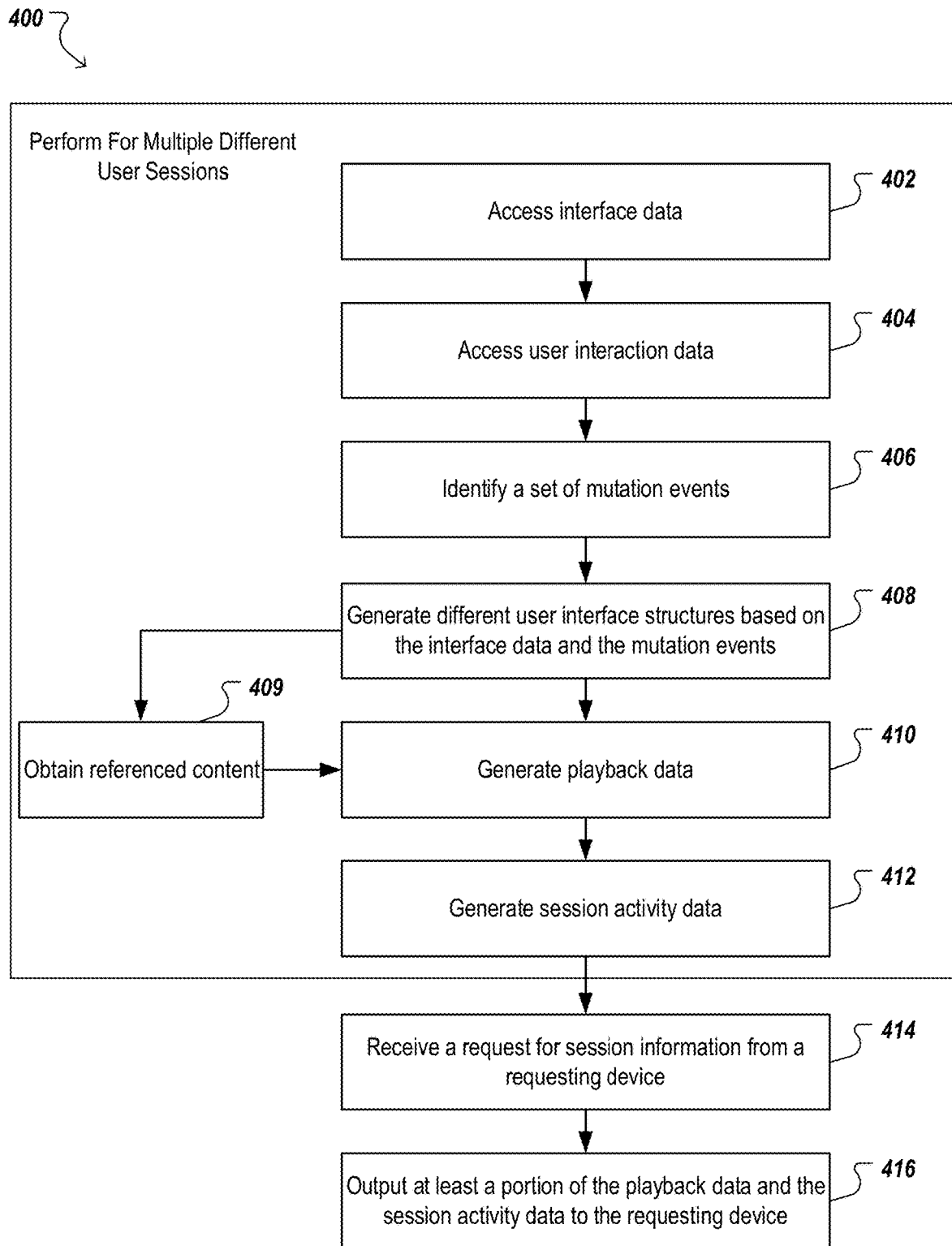
FIG. 4 is a flow chart of an example process for generating and outputting playback data and session activity data.

FIG. 4 is a flow chart of an example process 400 for generating and outputting playback data and session activity data. Operations of the process 400 can be performed, for example, by one or more data processing apparatus, such as the evaluation apparatus 110 and/or the event processing apparatus 206. Operations of the process 400 can also be implemented as instructions stored on a non-transitory computer readable medium. Execution of the instructions cause one or more data processing apparatus to perform operations of the process 400.

Interface data are accessed (402). In some implementations, the interface data specifying a structure of a user interface presented during a user session. For example, the interface data can specify an initial user interface structure at the beginning of a user session. The initial user interface structure can be specified and/or represented using a DOM or another hierarchical representation.

The interface data can be accessed, for example, from a data store storing the interface data. In some implementations, the interface data are created using one or more mutation events corresponding to an initial page load (or an initial launch of a native application). For example, as discussed above, each mutation events corresponding to an initial page load can be captured by a user device (e.g., using a mutation observer). The user device can either upload each mutation event separately, or store a set of mutation events that are then uploaded together, for example, to a data processing apparatus such as the evaluation apparatus 110. The mutation events can be used to reconstitute the initial structure of the user interface at the end of the initial page load. In some implementations, the user interface can wait until the initial page load is completed, and then upload a full structure of the initial DOM.

User interaction data are accessed (404). In some implementations, the user interaction data specifying user interactions with the user interface during a user session. For example, as discussed above with reference to FIG. 1, the user interaction data can specify one or more of pointer movement, user clicks, user taps, user swipes, zoom operations, display scrolls, focus actions, or text entry.

The user interaction data can be accessed, for example, from a data store storing the user interaction data. In some implementations, the user interaction data are captured during a user session using an interaction tracking script that is embedded in a resource (or native application). In some implementations, the user device uploads data specifying each individual user interaction. For example, the user device can upload data specifying each user click or each location at which a pointing device (e.g., mouse) was detected. In some implementations, continuous user interactions (e.g., mouse movements) can be represented by a mathematical function (or another manner) in order to reduce the amount of data that is uploaded by the user device. For example, as discussed above with reference to FIG. 2, a mouse movement can be characterized by a starting location, an ending location, and a mathematical relationship that represents the movement of the mouse between the starting location and the ending location. The amount of data required to represent the starting location, ending location, and mathematical representation of the path traveled by the mouse will be less than the amount of data required to upload each location of the mouse between the starting location and the ending location.

A set of mutation events are identified (406). In some implementations, the set of mutation events specify changes to the structure of the user interface that occurred during a user session. For example, as discussed above, each mutation events can specify a change to a given user interface element, a removal of the given user interface element, or the addition of a new user interface element. The set of mutation events can be identified, for example, from mutation data that are received from the user device. In some implementations, the mutation data received from the user device are obtained using a mutation observer (e.g., a script embedded in our resource (or native application) that detects changes to the structure of the user interface and reports those changes to a specified data processing apparatus such as the evaluation apparatus 110 and/or event processing apparatus 206).

Multiple different user interface structures are generated based on the interface data and the mutation events (408). The user interface structures can represent a structure of the user interface at various points throughout the given user session. In some implementations, each different user interface structure corresponds to a different user interface state during the user session. For example, an initial user interface structure may correspond to the beginning state of the user interface during a given user session. A next user interface structure can correspond to a next subsequent state of the user interface during the given user session, and so on. Each user interface structure can be represented using a DOM or another hierarchical representation of the user interface.

In some implementations, each different user interface structure is generated by modifying a given user interface structure based on a subsequent mutation event. For example, as discussed above with reference to FIG. 2, DOM1 can be generated by modifying the initial user interface structure DOM0 based on a first mutation event that occurred following the initial page load corresponding to DOM0. Similarly, with reference to FIG. 2, after DOM1 is generated, DOM1 can be modified using a next mutation event to generate DOM2. As discussed above, each generated user interface structure can be stored in a data store.

The playback data can also be generated to include instructions that visually present animation or other visual indications representing user interactions with the user interface. For example, as discussed above with reference to FIG. 3, the playback data can visually present an animation indicating that a user clicked at a given location in the user interface, swiped or tapped on a given portion of a touch interface, moved a pointed (e.g., a mouse), or performed some other user interaction with the user interface.

In some implementations, the playback data are generated to cause a given activity from an activity list to be highlighted (or otherwise visually emphasized) when replay of the user session corresponds to the given activity. For example, as discussed above with reference to FIG. 3, different activities from an activity list presented during replay of a user session can be sequentially highlighted as the portion of the user session being replayed corresponds to the highlighted activity.

Referenced content is optionally obtained and stored (409). Reference content refers to content that is referenced in code of a resource (or native application), and obtained from a location (e.g., network location) specified in the reference. For example, content that changes often and/or other content can be stored at a network location and retrieved by a user device when a resource is being rendered by the user device. Therefore, each time that the resource is rendered, a request for the referenced content is transmitted to a server (or another device) that provides the reference content.

While it is not necessary to obtain the referenced content in order to facilitate replay of the session, each replay of the session will require a request for the referenced content from the server that provides the referenced content. As such, obtaining the referenced content and storing the referenced content with the user interface structure can reduce the number of requests required to be processed by the server that provides the referenced content. Additionally, latency associated with providing playback data for a given session can be reduced since the referenced content is readily available.

The referenced content can be obtained, for example, in response to a determination that a portion of the content presented in the user interface during the user session is obtained from a specified network location. For example, the DOM of the user interface can be examined to determine that a portion of the content is requested from the specified network location when the user interface is loaded by a user device.

In some implementations, the referenced content is stored using a file name that is generated based on the content. For example, a hash of the data of representing the referenced content can be computed and the hash value obtained from the hash can be used as the filename for the stored referenced content. Periodically, a current version of the referenced content can again be obtained from the source of the referenced content (e.g., the network location specified in the code of the resource), and a hash of the data representing the current version of the referenced content can be computed.

The hash value resulting from the hash of the current version of the referenced content can be compared to the hash value of the stored version (e.g., previously obtained version) of the hash value to determine if the hash values of the two versions match. If a match exists, the current version of the referenced content is considered to be the same as the previous version of the referenced content, and the stored version of the referenced content continues to be used for newly acquired user sessions. If no match exists, the current version of the referenced content is considered to be different than the previous version of the referenced content. In this situation, the current version of the referenced content is obtained from the specified network location, stored (e.g., according to the newly computed hash value), and used for the current user session being acquired and for subsequent user sessions until the referenced content is again determined to have changed. Storing the various versions of the referenced content enables replay of each user session to present the version of the referenced content that was being used at the time that the user session occurred, rather than each replay only using the current version of the referenced content.

Playback data are generated (410). In some implementations, the playback data cause presentation of visual changes to the user interface over a user session. The visual changes will correspond to the set of mutation events that occurred during the user session (e.g., as indicated by the obtained mutation data). For example, as discussed above with reference to FIG. 3, the playback data can include instructions that cause visual changes corresponding to each DOM change to be presented during a replay of the user session. The playback data for a given user session can include, for example, data representing each different user interface structure that was detected during the given user session (e.g., based on the initial user interface structure and the identified mutation events).

The playback data can also be generated to include instructions that visually present animation or other visual indications representing user interactions with the user interface. For example, as discussed above with reference to FIG. 3, the playback data can visually present an animation indicating that a user clicked at a given location in the user interface, swiped or tapped on a given portion of a touch interface, moved a pointed (e.g., a mouse), or performed some other user interaction with the user interface.

In some implementations, the playback data are generated to cause a given activity from an activity list to be highlighted (or otherwise visually emphasized) when replay of the user session corresponds to the given activity. For example, as discussed above with reference to FIG. 3, different activities from an activity list presented during replay of a user session can be sequentially highlighted as the portion of the user session being replayed corresponds to the highlighted activity.

The playback data that are generated can also include any referenced content that was obtained. For example, the referenced content for a given user interface can be retrieved from the data store at which it was stored.

Session activity data are generated (412). In some implementations, the session activity data are generated based on the user interaction data and contextual data corresponding to the user interactions. For example, the session activity data can specify one or more user interactions with the user interface and/or resource requests, as discussed above with reference to FIG. 3. The contextual data can be based on one (or more) of the user interface states that existed during the user session. For example, the DOM of the user interface can be navigated by traversing links from a node of the DOM corresponding to the user interface element with which the user interaction occurred. One or more of the nodes will provide information about the user interface element, which can be used in conjunction with the user interaction data to generate session activity data.

More specifically, a given DOM (e.g., from the multiple DOMs) representing the structure of the user interface when a given user interaction occurred can be identified based on the user interaction data. For example, a timestamp of the given user interaction (or an event number) can be used to identify the given DOM of the user interface at the time of the user interaction. Within the given DOM, a node representing the user interface element can be identified. For example, if the user interaction data specified "ID300 click," the node representing ID300 can be identified in the given DOM. In turn, nodes that are connected to the node representing ID300 can be traversed to identify contextual data specifying one or more attributes of the user interface element ID300. For example, the contextual data associated with the traversed nodes can indicate that ID300 is a button that includes the text "next image." The traversed nodes can also indicate a location of ID300, visual attributes (e.g., color, shape, and/or size) of ID300, as well as other attributes of ID300. This contextual information can be combined, for example, with the user interaction data to create session activity data describing the given user interaction (e.g., click on "next image" button).

In some implementations, the session activity data (or user interaction data) can be indexed according to the state of the user interface at the time a given user interaction occurred. For example, each user interaction that occurred when a given user interface element (e.g., an interactive button, a portion of text, a given image, or another user interface element) was presented in the user interface can be indexed according to that given user interface element (or DOM). Indexing the session activity data according to the state of the user interface at the time of the given user interaction facilitates searching based on the state of the user interface and/or the user interaction. For example, assume that a publisher is interested in identifying sessions during which a given version of a user interface was being used and during which a user clicked on a given user interface element. In this example, the publisher can submit a search request specifying the given version of the user interface and the user interaction. The search request can then be used to identify, from the indexed session activity data, the user sessions during which the given version of the user interface was presented (e.g., sessions during which a given user interface state was used). The search request can also be used to identify, from those sessions during which the given version of the user interface was presented, the sessions during which the specified user interaction occurred. In turn, data specifying the user sessions responsive to the search request can be presented to the publisher.

In some implementations, the session activity data are generated to include an activity list that specifies user interactions with the user interface during the user session and at least a portion of the contextual data for each of the user interactions. For example, as discussed above with reference to FIG. 3, the activity list can include at least a specified set (or types) of user interactions that occurred during the user session, and the session activity data can include instructions that cause the activity list to be presented concurrently with the visual changes presented by the playback data.

In some implementations, the session activity data are generated to include an activity report. The activity report can include, for example, at least one of a total number of user sessions in which a given activity (e.g., user interaction, page request, or event) occurred, a portion of all user sessions in which the given activity occurred, a total number of user sessions in which a specified combination of activities occurred, or a portion of all user sessions in which the specified combination of activities occurred. For example the report data can specify a total number of users that terminated a user session after clicking on a checkout button, a portion of all users that terminated the user session, or other combinations of user activities that were (or were not) performed during at least some of the user sessions.

In some implementations, the activity report can identify commonalities and/or differences corresponding to groups of user sessions during which a given user activity occurred relative to user sessions during which a given user activity did not occur. For example, assume that 70% of users that terminated the user session after clicking the checkout button also clicked on a same user interface element prior to terminating the user session, while only 10% of the users that did not terminate the user session after clicking on the checkout button clicked on that same user interface element. In this example, the activity report can identify this distinction between the two activities (e.g., terminating after clicking checkout vs. not terminating after clicking checkout), and enable the publisher to replay the user sessions and/or view other data corresponding to these user sessions to identify potential reasons why such a large portion of users that clicked on that same user interface element terminated their user sessions.

In some implementations, the activity report can also be associated with the playback data and/or activity list to provide, during replay of a user session, a publisher with information regarding a number (or portion) of other user sessions during which a given activity occurred. For example, assume that replay of a user session reaches a point at which a user has navigated to a checkout page due to a click on a checkout button. In this example, the activity report can be presented concurrently with the replay of the user session, and provide information regarding a portion of users that terminated their session when those users navigated to the presented checkout page. The activity report can also link to a list of the user sessions that were terminated and/or provide information regarding commonalities and/or differences among sessions that were terminated relative to sessions that were not terminated. The list of user sessions can enable the publisher to request replay of each user session by interacting with text (or a user interface element, such as a button) corresponding to the user session.

A request for session information is received from a requesting device (414). In some implementations, the request for session information can be received in the form of a search input. For example, as discussed above, the request can include a search phrase, such as "click next image" to identify user sessions during which a user clicked the next image button. The request can also be received through user interaction with a user interface element corresponding to a given user session. For example, without submitting a particular search, a publisher can be provided with a list of all user sessions, and can interact with a user interface element (e.g., a button or text identifying the session) to submit a request for session information corresponding to that session.

At least a portion of the playback data and the session activity data are output to the requesting device (416). The portion of the playback data and the session activity data can be output, for example, to a publisher device with which a publisher submitted the request for session information. The output data can cause presentation of user session replay, activities that occurred during the user session, and/or session report information.

Figure 5:
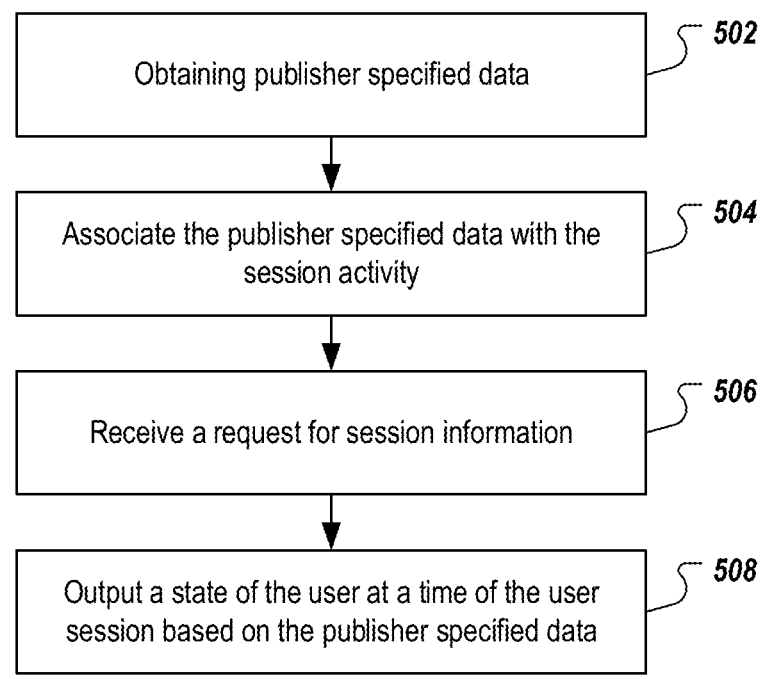
FIG. 5 is a flow chart of an example process for providing a state of a user at a time of a user session.

FIG. 5 is a flow chart of an example process 500 for providing a state of a user at a time of a user session. Generally, operations of the process 500 enable a given publisher to specify additional data (e.g., beyond the mutation data, user interaction data, and interface data that are used to evaluate user sessions. For example, the publisher can upload, during a given user session, additional data specifying a state of a user at a time of the user session. The additional data can specify, for example, information such as a total number of visits of the user to the publisher's website, an amount of time spent by the user on the website, information regarding prior purchases made by the user or a total value of all purchases made by the user up to the time of the user session, or other information that the publisher may provide about the user. This information can be associated with the user session to facilitate further evaluation of how different types of users prefer to interact with a given website (or native application) and/or how different types of experiences with the given website impact the effectiveness of the website relative to different types of users. For example, a publisher could submit a request for session information related to users that had a historical purchase value of less than $X, and terminated their user session after interacting with a specified user interface element, and replay sessions returned in response to the request.

Operations of the process 500 can be performed, for example, by one or more data processing apparatus, such as the evaluation apparatus 110 and/or the event processing apparatus 206. Operations of the process 500 can also be implemented as instructions stored on a non-transitory computer readable medium. Execution of the instructions cause one or more data processing apparatus to perform operations of the process 500.

Publisher specified data are obtained (502). In some implementations, the publisher specified data are obtained during a given user session, and are associated with a user of the user session. For example, assume that a user identifier (e.g., a cookie identifier) is detected by the publisher during a given user session. In this example, code in the publisher's resource (or native application) can request additional data corresponding to the user identifier from a database of the publisher. For example, historical purchase information, download information, or other information that the publisher has stored in association with the user identifier can be obtained from the publisher's data store and uploaded as part of the event data. As noted above, the publisher specified data can be any data that the publisher has previously associated with the user identifier, but can be independent of (e.g., different from) the interface data, user interaction data, and mutation data.

The publisher specified data are associated with the session activity of a session (504). In some implementations, the publisher specified data can be indexed according to each user session with which the user identified is associated. In some implementations, each user session associated with a given user identifier will be associated only with the publisher specified data that was uploaded with that user session (and/or previous user sessions). For example, if the publisher specified data is a total purchase amount of the user to date, each user session may only be stored in association with the total purchase amount of the user at the time of the user session, so that the current state of the user (e.g., total purchase amount to date) at the time of the user session is associated with the user session.

The publisher specified data may be data that changes during a given user session, and associated with different portions of the given user session. For example, the publisher specified data may be a total value of items added to a user's shopping cart during the given user session. In this example, each identified value can be associated with a corresponding user interface structure or session activity, so that the state of the user (e.g., the value of their shopping cart) can be provided at various points throughout replay of the given user session.

A request is received for session information (506). As discussed, above, the request can be received in the form of a search query or through interaction with other user interface elements that initiate a request for session information.

A state of the user at a time of a user session is determined and output based on the publisher specified data (508). In some implementations, the state of the user at the time of the user session can be determined, for example, based on the publisher specified data that was associated with the user session. For example, if the publisher specified data includes a total purchase amount by the user, the state of the user for a given user session can be determined by identifying the total purchase amount from the publisher specified data that are associated with the given user session. The state of the user can be output with the playback data and/or session activity data in response to a request for session information. For example, data specifying the state of the user at a time of each session (or at a point of time during a given session) can be presented concurrently with the replay of the user session and/or the session activities.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving, from a client device, a query specifying a given user interface condition;
   identifying, from a multidimensional index of prior user sessions, a set of user sessions in which the given user interface condition existed;
   responding, by one or more data processing apparatus, to the query with (i) a list of user sessions included in the set of user sessions in which the given user interface condition existed and (ii) information indicating how many user sessions in which the given user interface condition existed;
   reconstituting, by the one or more data processing apparatus, playback of at least one user session among the set of users sessions in which the given user interface condition existed, wherein reconstituting playback of the at least one user session comprises generating playback data that cause the client device to present (i) a first visual representation of a particular version of a user interface as previously presented during the at least one user session and (ii) visual changes to the particular version of the user interface that occurred during the at least one user session according to mutation data specifying user interface structure changes to the particular version of the user interface that occurred during the at least one user session;
   providing the reconstituted playback of the at least one user session to the client device; and
   highlighting, in a presentation of an activity list at the client device, a portion of the activity list specifying a user interaction that corresponds to visual changes of the given user interface in the reconstituted playback being presented at the client device.

2. The method of claim 1, further comprising presenting visual indications of user interactions with the particular version of the user interface that occurred during the at least one user session.

3. The method of claim 1, wherein the user interface is a native application user interface.

4. The method of claim 3, wherein reconstituting the playback comprises reconstituting the playback of a mobile session using event data collected from the native application executing at a mobile client device.

5. The method of claim 1, further comprising:
   creating the multidimensional index of prior user sessions, including:
   receiving, for each particular user session among a plurality of different user sessions, a set of event data corresponding to a user interface structure of a user interface presented at a user device during the particular user session and mutation data specifying user interface structure changes to the user interface that occurred at the user device during the particular user session; and
   indexing the set of event data for each particular user session based on one or more conditions that existed during the particular user session.

6. A non-transitory computer readable medium storing instructions that upon execution by one or more data processing apparatus cause the one or more data processing apparatus to perform operations comprising:
   receiving, from a client device, a query specifying a given user interface condition;
   identifying, from a multidimensional index of prior user sessions, a set of user sessions in which the given user interface condition existed;
   responding to the query with (i) a list of user sessions included in the set of user sessions in which the given user interface condition existed and (ii) information indicating how many user sessions in which the given user interface condition existed;
   reconstituting playback of at least one user session among the set of users sessions in which the given user interface condition existed, wherein reconstituting playback of the at least one user session comprises generating playback data that cause the client device to present (i) a first visual representation of a particular version of a user interface as New during the at least one user session and (ii) visual changes to the particular version of the user interface that occurred during the at least one user session according to mutation data specifying user interface structure changes to the particular version of the user interface that occurred during the at least one user session;
   providing the reconstituted playback of the at least one user session to the client device; and
   highlighting a portion of an activity list specifying a user interaction that corresponds to visual changes of the user interface being presented at the client device.

7. The non-transitory computer readable medium of claim 6, wherein the instructions cause the one or more data processing apparatus to perform operations further comprising presenting visual indications of user interactions with the particular version of the user interface that occurred during the at least one user session.

8. The non-transitory computer readable medium of claim 6, wherein the user interface is a native application user interface.

9. The non-transitory computer readable medium of claim 8, wherein reconstituting the playback comprises reconstituting the playback of a mobile session using event data collected from the native application executing at a mobile client device.

10. The non-transitory computer readable medium of claim 6, wherein the instructions cause the one or more data processing apparatus to perform operations further comprising:

creating the multidimensional index of prior user sessions, including:
  receiving, for each particular user session among a plurality of different user sessions, a set of event data corresponding to a user interface structure of a user interface presented at a user device during the particular user session and mutation data specifying user interface structure changes to the user interface that occurred at the user device during the particular user session; and
  indexing the set of event data for each particular user session based on one or more conditions that existed during the particular user session.

11. A system comprising:
a data storage device; and
one or more data processing apparatus configured to interact with the data storage device and execute instructions that cause the one or more data processing apparatus to perform operations comprising:
  receiving, from a client device, a query specifying a given user interface condition;
  identifying, from a multidimensional index of prior user sessions, a set of user sessions in which the given user interface condition existed;
  responding to the query with (i) a list of user sessions included in the set of user sessions in which the given user interface condition existed and (ii) information indicating how many user sessions in which the given user interface condition existed;
  reconstituting playback of at least one user session among the set of users sessions in which the given user interface condition existed, wherein reconstituting playback of the at least one user session comprises generating playback data that cause the client device to present (i) a first visual representation of a particular version of a user interface as during the at least one user session and (ii) visual changes to the particular version of the user interface that occurred during the at least one user session according to mutation data specifying user interface structure changes to the particular version of the user interface that occurred during the at least one user session;
  providing the reconstituted playback of the at least one user session to the client device; and
  highlighting a portion of an activity list specifying a user interaction that corresponds to visual changes of the user interface being presented at the client device.

12. The system of claim 11, wherein the instructions cause the one or more data processing apparatus to perform operations further comprising presenting visual indications of user interactions with the particular version of the user interface that occurred during the at least one user session.

13. The system of claim 11, wherein the user interface is a native application user interface.

14. The system of claim 13, wherein reconstituting the playback comprises reconstituting the playback of a mobile session using event data collected from the native application executing at a mobile client device.

* * * * *